United States Patent [19]

Mikami et al.

[11] Patent Number: 4,810,189
[45] Date of Patent: Mar. 7, 1989

[54] TORCH FOR FABRICATING OPTICAL FIBER PREFORM

[75] Inventors: Masatoshi Mikami; Kunihiro Matsubara, both of Ichihara, Japan

[73] Assignee: Furukawa Electric Co., Ltd., Tokyo, Japan

[21] Appl. No.: 13,088

[22] Filed: Feb. 10, 1987

[30] Foreign Application Priority Data

Feb. 12, 1986 [JP] Japan .................................. 61-28518

[51] Int. Cl.$^4$ ............................................. F23D 14/62
[52] U.S. Cl. ...................................... 431/354; 431/349; 431/351
[58] Field of Search ................. 431/354, 349, 351, 355

[56] References Cited

U.S. PATENT DOCUMENTS

| | | | |
|---|---|---|---|
| 2,858,729 | 11/1958 | Keyes | 431/354 X |
| 3,032,096 | 5/1962 | Stout | 431/354 X |
| 3,265,114 | 8/1966 | Childree | 431/354 X |
| 3,729,285 | 4/1973 | Schwedersky | 431/351 X |
| 3,773,459 | 11/1973 | Akhmedou et al. | 431/354 X |
| 4,610,625 | 9/1986 | Bunn | 431/351 X |

*Primary Examiner*—Larry Jones
*Attorney, Agent, or Firm*—Foley & Lardner, Schwartz, Jeffery, Schwaab, Mack, Blumenthal & Evans

[57] ABSTRACT

A torch for fabricating an optical fiber perform which has a plurality of raw gas injection passages at the center of the torch, a plurality of small-diameter combustion supporting gas injection passages independent of each other and disposed to surround the raw gas injection passages on the outer periphery of the raw gas injection passages disposed at the center of the torch, and an annular combustible gas injection passage disposed around the small-diameter combustion supporting gas injection passages. Thus, the torch can stably manufacture porous glass preforms.

30 Claims, 2 Drawing Sheets

SiCl₄  H₂
GeCl₄  O₂
POCl₃

SiCl₄  H₂
GeCl₄  O₂
POCl₃  INERT GAS

TORCH FOR FABRICATING OPTICAL FIBER PREFORM

BACKGROUND OF THE INVENTION

This invention relates to a torch for fabricating an optical fiber perform in case of manufacturing a porous glass preform for a communication or optics through a VAD method or an OVD method.

A VAD method or an OVD method which mixes less impurities and OH group is employed as means for fabricating a porous glass preform for an optical fiber, an image fiber, a light guide or a rod lens.

Each of the above-mentioned methods supplies raw gas, combustible gas and combustion supporting gas or these gases and sealing gas to a torch for fabricating a porous glass preform, produces soot-state porous glass preform by flame hydrolysis and/or thermal oxidation, and accumulates the preform in a desired shape such as a rod or tube shape.

A torch used in these methods has a multiwall tube structure of triple or more wall tubes. When the torch is formed, for example, of a quadruple wall tube structure, the passages from the center to the outermost periphery of the torch are used as a raw gas injection passage (first passage: at the center), a sealing gas injection passage (second passage), a combustible gas injection passage (third passage) and a combustion supporting gas injection passage (fourth passage: the outermost periphery).

The raw gas contains $SiCl_4$ of main raw gas, and $GeCl_4$, $POCl_3$, $BCl_3$, of doping raw materials. The combustible gas contains hydrogen ($H_2$), methane, propane, butane or a mixture gas of any two or more gases. The combustion supporting gas contains oxygen ($O_2$), and the sealing gas contains Ar and/or other inert gas.

Principles of accumulating the optical fiber preforms in the VAD and OVD methods are fundamentally the same, but the VAD method accumulates the optical fiber preform on the lower end of a vertical target drawn while rotating, and the OVD method accumulates the optical fiber preform on the outer periphery of a mandrel rotating in a horizontal state.

The porous glass preform thus accumulated and formed through the above methods is dehydrated and transparently vitrified by the following heat treatment to become a transparent preform which contains no air bubble.

In case of the above-mentioned VAD method, the porous glass preform is grown axially by the accumulation of the optical fiber preform. In this case, as the preform is grown, a large own weight is applied to the preform. Thus, when a long and large porous glass preform is produced, the preform tends to be damaged by the weight of itself.

Therefore, it is necessary to improve the strength of the preform to enhance the accumulating density of the optical fiber preform when fabricating the large-size porous glass preform by the VAD method.

In case of the OVD method for accumulating an optical fiber preform on the outer periphery of a mandrel of horizontal state, no damage occurs in the porous glass preform as observed in the VAD method, but as the optical fiber preform is accumulated, the diameter of the preform increases so that the surface area of the preform gradually increases. Thus, the quantity of heat of unit area/unit time of a flame generated from a torch to the surface of the preform alters, and the quantity of heat at the end of accumulating the optical fiber preform becomes considerably smaller than that at the initial time.

The shrink-fitting degree of the porous glass preform becomes insufficient toward the end of the accumulation due to such a phenomenon so that there is a difference in the density of the optical fiber preform over the radial direction of the preform between the central portion and the peripheral portion.

The density of the porous glass preform is preferably 0.4 to 1.0 $g/cm^3$. If the density of the porous glass preform decreases below this value due to the insufficient shrink-fitting degree, a crack occurs in the preform along the longitudinal direction of the preform at growing or cooling time.

To eliminate this drawback, the rotating speed of the preform is decelerated in response to the growth of the preform or the quantity of combustion gas is increases.

However, in the former case that the rotating speed of the preform is decelerated, a cause of an uneven surface is produced on the surface of the porous glass preform or an improper outer diameter is produced in the preform.

In the latter case that the quantity of combustion gas is increased, this method depends upon an uncertain process of setting experimentally the increasing amount of the gas and is very difficult to gradually increase the combustible gas to eliminate the uneven accumulating density of the optical fiber preform by preventing the preform from cracking when considering that a flame generated from a torch is of a converging shape.

As described above, the method of fabricating the porous glass preform with a conventional torque of multiwall tube structure can hardly provide a large-size preform having uniform optical fiber preform density without crack nor improper outer diameter.

SUMMARY OF THE INVENTION

Accordingly, an object of this invention is to provide a torch for fabricating an optical fiber preform capable of stably manufacturing a porous glass preform.

In order to achieve the above and other objects of this invention, there is provided according to an aspect of this invention a torch for fabricating an optical fiber preform comprising a plurality of raw gas injection passages at the center of the torch, a plurality of small-diameter combustion supporting gas injection passages independent of each other and disposed to surround the raw gas injection passages on the outer periphery of the raw gas injection passage disposed at the center of the torch, and an annular combustible gas injection passage disposed around of the small-diameter combustion supporting gas injection passages.

According to another aspect of this invention, there is provided to achieve the above and other objects of this invention a torch for fabricating an optical fiber preform comprising a plurality of raw gas injection passages at the center of the torch, a plurality of small-diameter combustion supporting gas injection passages independent of each other and disposed to surround the raw gas injection passages on the outer periphery of the raw gas injection passages disposed at the center of the torch, an annular combustible gas injection passage disposed around the small-diameter combustion supporting gas injection passages, and an annular combustion supporting gas injection passage provided on the outer periphery of the annular combustion gas injection passage.

According to still another aspect of this invention, there is provided to achieve the above and other objects of the invention a torch for fabricating an optical fiber preform comprising a plurality of raw gas injection passages at the center of the torch, a first annular sealing gas injection passage provided on the outer periphery of the raw gas injection passage disposed at the center of the torch, a plurality of small-diameter combustion supporting gas injection passages independent of each other and disposed to surround the annular sealing gas injection passage on the outer periphery of the first annular sealing gas injection passage, an annular combustible gas injection passage disposed around the small-diameter combustion supporting gas injection passages, a second sealing gas injection passage provided on the outer periphery of the annular combustible gas injection passage, and an annular combustion supporting gas injection passage provided on the outer periphery of the second sealing gas injection passage.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of a torch for fabricating an optical fiber preform according to the present invention will be described in detail with reference to the accompanying drawings.

Figure 1:
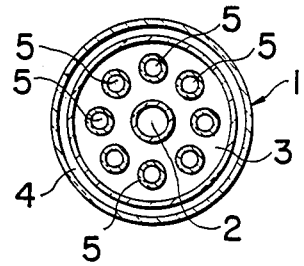
FIG. 1 is a plan view showing a first embodiment of a torch according to the present invention.
Figure 2:
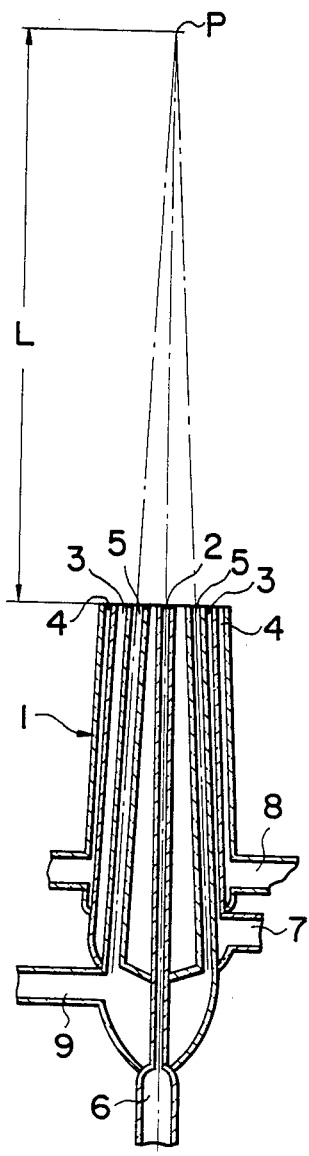
FIG. 2 is a longitudinal sectional view of the torch of FIG. 1.

FIGS. 1 and 2 show a first embodiment of a torch according to the present invention. A torch 1 of a multi-wall tube structure shown in FIGS. 1 and 2 has a raw gas injection passage 2 provided at the center of the torch 1, an annular combustible gas injection passage 3 provided on the outer periphery of the raw gas injection passage 2, an annular combustion supporting gas injection passage 4 provided on the outer periphery of the combustible gas injection passage 3, and a plurality of small-diameter combustion supporting gas injection passages 5 independent of each other and provided at an (equal) interval circumferentially in the combustible gas injection passage 3.

In case of such a torch 1, as apparent from FIG. 1, the smalldiameter combustion supporting gas injection passages 5 disposed in the combustion gas injection passage 3 surround the raw gas injection passage 2 disposed at the center of the torch 1.

Further, the small-diameter combustion supporting gas injection passages 5 are, as apparent from FIG. 2, directed toward a point P on the center line of the raw gas injection passage 2, of so-called a focus converging type.

A distance L from the end of the torch 1 to the point P is ordinarily set to a range of approx. 30 to 350 mm, and more particularly to L=approx. 200 mm.

As shown in FIG. 2, gas inlets 6, 7, 8 and 9 are provided correspondingly to the gas injection passages 2, 3, 4 and 5 at the lower portion of the torch 1.

Figure 3:
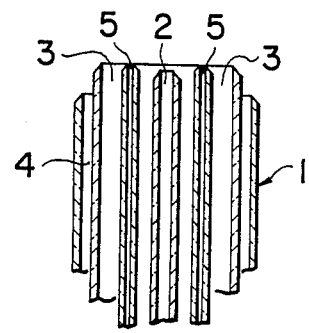
FIG. 3 is a longitudinal sectional view of an essential portion of a second embodiment of a torch according to the present invention.

A torch 1 of multiwall tube structure of a second embodiment of the invention shown in FIG. 3 is constructed fundamentally the same as that in FIGS. 1 and 2 except a raw gas injection passage 2, an annular combustible gas injection passage 3, an annular combustion supporting gas injection passage 4 and a small-diameter combustion supporting gas injection passage 5 are disposed in parallel with each other and that the injection passages 3, 5, 2 and 4 are sequentially protruded at the ends in the relative relationship of the passages.

Further, in the torch 1 of FIG. 3, the ends of the raw gas injection passage 2 and the small-diameter combustion supporting gas injection passage 5 are formed in spherical shape.

It is noted that the constructions of the difference (uneven state) of the projecting states of the ends of the injection passages or the spherical shape of the ends of the injection passages in the second embodiment of the invention may also be employed in the first embodiment in FIGS. 1 and 2 and in the following third embodiment of the invention as will be described later within the spirit and scope of the invention.

Further, it is also noted that in the torch 1 of the abovementioned first and second embodiments, the annular combustion supporting gas injection passage 4 may be omitted within the spirit and scope of the invention.

Figure 4:
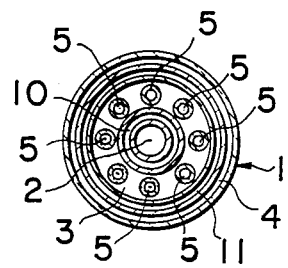
FIG. 4 is a plan view showing a third embodiment of a torch according to the invention.

A torch 1 of multiwall tube structure of a third embodiment of the invention shown in FIG. 4 is constructed such that a raw gas injection passage 2, a first annular sealing gas injection passage 10, an annular combustible gas injection passage 3, a second annular sealing gas injection passage 11 and an annular combustion supporting gas injection passage 4 are sequentially provided from the center of the torch 1 toward the outer periphery and a plurality of small-diameter combustion supporting gas injection passages 5 independent of each other are provided at an interval in the circumferential direction within the annular combustion gas injection passage 3.

As further embodiments, a plurality of raw gas injection passages and/or a plurality of combustible gas injection passages may be provided.

For example, in these embodiments, when two (or more) adjacent raw gas injection passages are provided at the center of the torch 1, other gas injection passages provided in a multiwall tube structure is formed in an elliptical shape on the outer periphery of the raw gas injection passage. When the small-diameter combustion supporting gas injection passages are formed in a focus converging type in this case, two focuses of the ellipse are defined to correspond to the small-diameter combustion supporting gas injection passages.

When two annular combustible gas injection passages are provided, one may be disposed at the position in the previous embodiments, and the other may be disposed, for example, on the outermost periphery of the torch 1.

The tubular or cylindrical material of the torch 1 is formed of a quartz glass or ceramics having high heat resistance, and may also be formed at the end sides of the gas injection passages of a quartz glass or ceramics and at the remainder of a metal having excellent corrosion resistance and medicine resistance.

Figure 5:
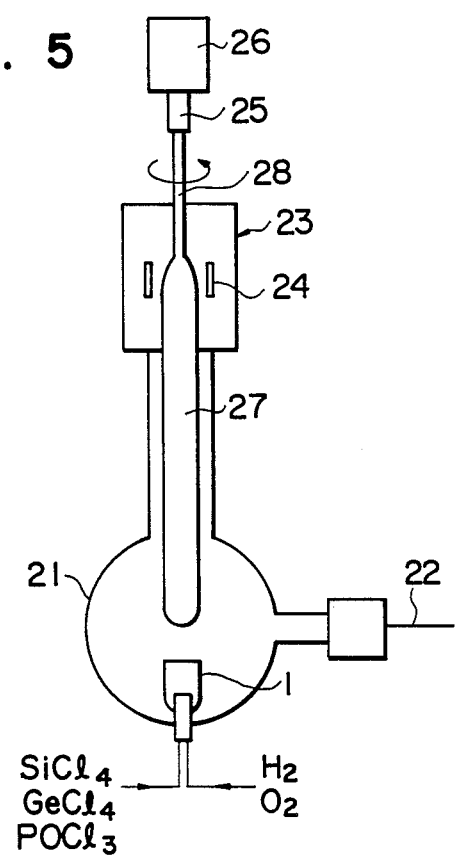
FIG. 5 is a schematic view showing a VAD method using the torch of the invention.
Figure 6:
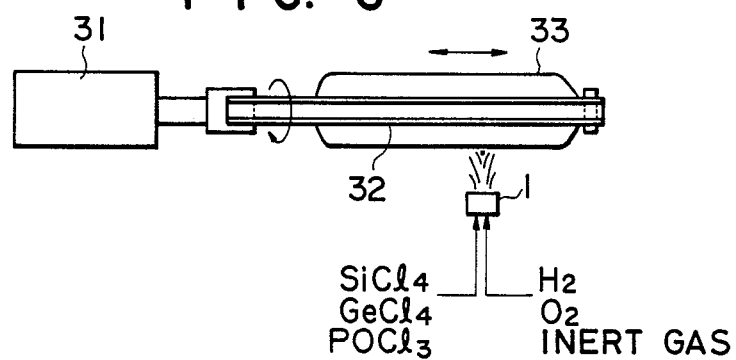
FIG. 6 is a schematic view showing an OVD method using the torch of the invention.

FIGS. 5 and 6 schematically show a VAD method and an OVD method executed by the torch 1 of the invention.

In the VAD method in FIG. 5, a system has a reaction vessel 21 which contains an exhaust conduit 22, an electric furnace 23 which contains a heater (an electric heater) 24 provided at the top of the vessel 21, a target 25 of quartz and a rotary drawing unit 26 of the target 25. According to the VAD method in this known system, an optical fiber preform produced through the torch 1 is sequentially acccumulated on the lower end of the target 25 to form a porous glass preform 27, the porous glass preform 27 is transparently vitrified through the electric furnace 23 to provide a rod-shaped transparent glass preform 28.

In the OVD method in FIG. 6, this system has a rotating and reciprocating type drive unit 31, and a mandrel 32 of quartz pipe supported by the drive unit 31. According to the OVD method in this known system, an optical fiber preform produced through the torch 1 is sequentially accumulated on the outer periphery of the mandrel 32 to provide a tubular porous glass preform 33.

The raw gas, the combustible gas, the combustion supporting gas and the sealing gas used in the above-mentioned VAD and OVD methods employ those known per se.

The torch 1 of the present invention is used in the above VAD and OVD methods as described above. In this case, the raw gas injected from the raw gas injection gas 2 is subjected to a flame hydrolysis and/or thermal oxidation with the combustible gas from the annular combustible gas injection passage 3 and the combustion supporting gas from the small-diameter combustion supporting gas injection passage 5 to become a soot-state optical fiber preform.

In this case, since the small-diameter combustion supporting injection passage 5 is formed in a nozzle shape, the combustion supporting gas injected from the small-diameter combustion supporting gas injection passage 5 flows at a very high speed. As a result, the combustion reaction of the combustible gas injected from the annular combustible gas injection passage 3 disposed around the small-diameter combustion supporting gas injection passage 5 with the combustion supporting gas is accelerated to increase the combustion amount, thereby providing a much higher temperature than a conventional multiwall tube burner. Therefore, the accumulation of the optical fiber preform is accelerated. Since the surface temperature of the porous glass preform formed by the accumulation of the optical fiber preform is very high and can be maintained at a uniform value, the optical fiber preform of the porous glass preform is uniformly and sufficiently shrink-fitted so that the porous glass preform of substantially uniform density of the optical fiber preform can be provided.

More particularly, when the small-diameter combustion supporting gas injection passages 5 are of focus converging type, the above-mentioned advantage is remarkable.

Since various gases are separately injected, for example, such that the combustion supporting gas is injected from the smalldiameter combustion supporting gas injection passages 5 and the combustible gas such as hydrogen is injected from the annular combustible gas injection passage 3 in the torch 1 of the invention, different from the case that the hydrogen and the oxygen are injected together in the preliminarily mixed state, a flame is formed at a position separate at a predetermined distance from the end of the torch 1. More specifically, since the flowing speed of the combustion supporting gas is accelerated as described above in this invention, a flame can be formed at the position separate from the end of the torch 1. As a consequence, such a problem that the soot formed by the combustion of the combustible gas and the combustion supporting gas and the optical fiber preform formed by the combustible gas, the combustion supporting gas and the raw gas are bonded to the end of the torch to cause the torch to clog is hardly taken place.

When the ends of the raw back injection passage 2 and the small-diameter combustion supporting gas injection passage 5 are formed of spherical shape, it can preferably prevent the optical fiber preform from being bonded to the end of the torch 1.

The first annular sealing gas injection passage 10 has an effect of preventing the raw gas injection passage 2 from being blocked by the optical fiber preform and the second annular sealing gas injection passage 11 protects against the thermal deformation of the end of the tubular or cylindrical member for partitioning the annular combustible gas injection passage 3 and the annular combustion supporting gas injection passage 4.

Further, the combustion supporting gas injected from the annular combustion supporting gas injection passage 4 contributes to the stability of a flame without direct relation to the synthesis of the optical fiber preform. In other words, the flame is uniformly formed in the temperature distribution over the center and the periphery. As a result, it can prevent the surface of the porous glass preform from becoming uneven, and additionally equalize the density of the optical fiber preform.

The reason is because the combustion supporting gas injected from the annular combustion supporting gas injection passage 4 interrupts the contact of the atmosphere with the combustible gas injected from the inside annular combustible gas injection passage 3 to allow the remaining unburnt combustible gas to be completely burnt by the combustion supporting gas. In other words, it prevents the remaining unburnt combustible gas injected from the inside annular combustion gas injection passage 3 from being subjected to an unstable combustion with oxygen in the air so that a disorder in the periphery of the flame is induced.

As an experimental example, the OVD method of FIG. 6 was executed under the following conditions with the torch 1 in FIGS. 1 and 2.

(I)

Raw gas injection passage 2: $SiCl_4$ (at 50° C.)=3l/min. (with Ar of carrier gas)
Combustible gas injection passage 3: $H_2$=35l/min. to 45l/min.
Combustion supporting gas injection passage 4: $O_2$=5l/min. to 8l/min.
Combustion supporting gas injection passage 5: $O_2$=16l/min.

(II)

Outer diameter of mandrel 32: 15 mm in diameter
Traverse speed: 100 mm/min.
Traverse zone: 350 mm Rotating speed of mandrel 32: 60 r.p.m.
Fabricating time: Approx. 6.5 hrs.

The porous glass preform fabricated under the above conditions had outer diameter× length=120 mm×350 mm., and the optical fiber preform density over radial direction was approx. 0.4 g/cm$^3$ being substantially constant and no crack observed.

According to the first embodiment the present invention as described above, the torch for fabricating the optical fiber preform in accordance with the invention disposes the small-diameter combustion supporting gas injection passages independent of each other and disposed to surround the raw gas injection passage on the outer periphery of the raw gas injection passage disposed at the center of the torch, and provides the annular combustible gas injection passage around the small-diameter combustion supporting gas injection passages. Accordingly, the porous glass preform can be stably fabricated by the specific arrangement of the smalldiameter combustion supporting gas injection passages.

According to the second embodiment of the present invention as described above, the torch for fabricating the optical fiber preform further disposes in the first embodiment the annular combustion supporting gas injection passage on the outer periphery of the annular combustible gas injection passage. Therefore, the torch of this embodiment can not only provide the above-mentioned advantages, but stabilize the flame through the annular combustion supporting gas injection passage over the entire radial direction.

According to the third embodiment of the invention as described above, the torch for fabricating the optical fiber preform further disposes in the above first and second embodiments the first and the second annular sealing gas injection passages between the predetermined gas injection passages. Consequently, the torch of this embodiment can not only provide the above-mentioned advantages, but prevent the raw gas injection passage from clogging by the optical fiber preform to protect the end of the tubular or cylindrical member of partitioning the annular combustible gas injection passage and the annular combustion supporting gas injection passage.

What is claimed is:

1. A torch for fabricating an optical fiber preform comprising:
    means for flowing raw gas through said torch comprising at least one raw gas injection passage at the center of said torch;
    means for flowing combustion supporting gas through said torch comprising a plurality of small-diameter, combustion supporting gas injection passages independent of each other and disposed to surround said raw gas injection passage; and
    means for flowing a combustible gas through said torch comprising an annular combustible gas injection passage disposed around said small-diameter combustion supporting gas injection passages.

2. The torch according to claim 1, wherein one raw gas injection passage is provided at the center of said torch.

3. The torch according to claim 2, wherein said raw gas injection passage and said annular combustible gas injection passage are formed of a concentrically regular circle.

4. The torch according to claim 1, wherein two raw gas injection passages are adjacently provided at the center of said torch.

5. The torch according to claim 4, wherein said annular combustible gas injection passage is formed in an elliptical shape.

6. The torch according to claim 1, wherein each of said small-diameter combustion supporting gas injection passages is directed toward a point on the center line of said torch.

7. The torch according to claim 1, wherein the ends of said raw gas injection passage and each of said small-diameter combustion supporting gas injection passages are formed in a spherical shape.

8. The torch according to claim 1, wherein the passage forming member of said torch is formed of a quartz glass.

9. The torch according to claim 1, wherein the passage forming member of said torch is formed of ceramics.

10. The torch according to claim 1, wherein said small-diameter combustion supporting gas injection passages are disposed in said annular combustible gas injection passage.

11. A torch for fabricating an optical fiber preform comprising:
    means for flowing raw gas through said torch comprising at least one raw gas injection passage at the center of said torch;
    means for flowing combustion supporting gas through said torch comprising a plurality of small-diameter combustion supporting gas injection passages independent of each other and disposed to surround said raw gas injection passages;
    means for flowing a combustible gas through said torch comprising an annular combustible gas injection passage disposed around said small-diameter combustion supporting gas injection passages; and
    further means for supplying a combustion supporting gas comprising an annular combustion supporting gas injection passage provided about the outer periphery of said annular combustible gas injection passage.

12. The torch according to claim 11, wherein one raw gas injection passage is provided at the center of said torch.

13. The torch according to claim 12, wherein said raw gas injection passage, said annular combustible gas injection passage and said annular combustion supporting gas injection passage are formed of a concentrically regular circle.

14. The torch according to claim 11, wherein two raw gas injection passages are adjacently provided at the center of said torch.

15. The torch according to claim 14, wherein said annular combustible gas injection passage and said annular combustion supporting gas injection passage are formed of a concentrically elliptical shape.

16. The torch according to claim 11, wherein each of said small-diameter combustion supporting gas injection passages is directed toward a point on the center line of said torch.

17. The torch according to claim 11, wherein the ends of said raw gas injection passage and each of said small-diameter combustion supporting gas injection passages are formed in a spherical shape.

18. The torch according to claim 11, wherein the passage forming member of said torch is formed of a quartz glass.

19. The torch according to claim 11, wherein the passage forming member of said torch is formed of ceramics.

20. The torch according to claim 11, wherein said small-diameter combustion supporting gas injection passages are disposed in said annular combustible gas injection passage.

21. A torch for fabricating an optical fiber preform comprising:
- means for flowing raw gas through said torch comprising at least one raw gas injection passage at the center of said torch;
- means for flowing a sealing gas through said torch comprising a first annular sealing gas injection passage provided on the outer periphery of said raw gas injection passage;
- means for flowing a combustion supporting gas through said torch comprising a plurality of small-diameter combustion supporting gas injection passages independent of each other and disposed to surround said annular sealing gas injection passage;
- means for flowing a combustible gas through said torch comprising an annular combustible gas injection passage disposed around said small-diameter combustion supporting gas injection passages;
- further means for flowing a sealing gas through said torch comprising a second sealing gas injection passage about said annular combustible gas injection passage; and
- further means for flowing a combustion supporting gas through said torch comprising an annular combustion supporting gas injection passage provided about said second sealing gas injection passage.

22. The torch according to claim 21, wherein one raw gas injection passage is provided at the center of said torch.

23. The torch according to claim 22, wherein said raw gas injection passage, said first sealing gas injection passage, said annular combustible gas injection passage and said second annular sealing gas injection passage are formed of a concentrically regular circle.

24. The torch according to claim 21, wherein two raw gas injection passages are adjacently provided at the center of said torch 25. The torch according to claim 24, wherein said first sealing gas injection passage, said annular combustible gas injection passage, said second annular sealing gas injection passage and said annular combustion supporting gas passage are formed of a concentrically elliptical shape.

26. The torch according to claim 21, wherein each of said small-diameter combustion supporting gas injection passages is directed toward a point on the center line of said torch.

27. The torch according to claim 21, wherein the ends of said raw gas injection passage and each of said small-diameter combustion supporting gas injection passages are formed in a spherical shape.

28. The torch according to claim 21, wherein the passage forming member of said torch is formed of a quartz glass.

29. The torch according to claim 21, wherein the passage forming member of said torch is formed of ceramics.

30. The torch according to claim 21, wherein said small-diameter combustion supporting gas injection passages are disposed in said annular combustible gas injection passage.

* * * * *